United States Patent [19]

Baugh

[11] Patent Number: 4,516,795
[45] Date of Patent: May 14, 1985

[54] TORUS TYPE CONNECTOR

[76] Inventor: Benton F. Baugh, 14626 Oak Bend, Houston, Tex. 77079

[21] Appl. No.: 343,496

[22] Filed: Jan. 28, 1982

[51] Int. Cl.³ ............................................. F16L 37/18
[52] U.S. Cl. .................................. 285/315; 285/320; 285/DIG. 22; 285/92
[58] Field of Search ............... 285/315, 316, DIG. 22, 285/320, 92

[56] References Cited

U.S. PATENT DOCUMENTS

| 2,770,474 | 11/1956 | Knapp ............................ 285/320 X |
| 3,096,999 | 7/1963 | Ahlstone et al. . |
| 3,222,088 | 12/1965 | Haeber . |
| 3,321,217 | 5/1967 | Ahlstone . |
| 3,492,027 | 1/1970 | Herring . |
| 3,554,579 | 1/1971 | Brown . |
| 4,337,971 | 7/1982 | Kendrick ............................ 285/315 |

FOREIGN PATENT DOCUMENTS 1314816  4/1973  United Kingdom ................ 285/315

Primary Examiner—Dave W. Arola
Attorney, Agent, or Firm—Pravel, Gambrell, Hewitt & Kimball

[57] ABSTRACT

A remotely operable torus type connector for releasably connecting the adjoining ends of tubular members together wherein each of the ends is provided with a locking shoulder and one of the ends has a plurality of locking segments pivotally mounted thereon with a surrounding torus section adapted to slidably engage the corresponding outer surface of the locking segments to pivot such segments inwardly or outwardly as the torus section is moved longitudinally thereof. The torus section is carried by a ring slidably mounted in a surrounding housing with hydraulic or mechanical means for sliding the ring in the torus section.

12 Claims, 4 Drawing Figures

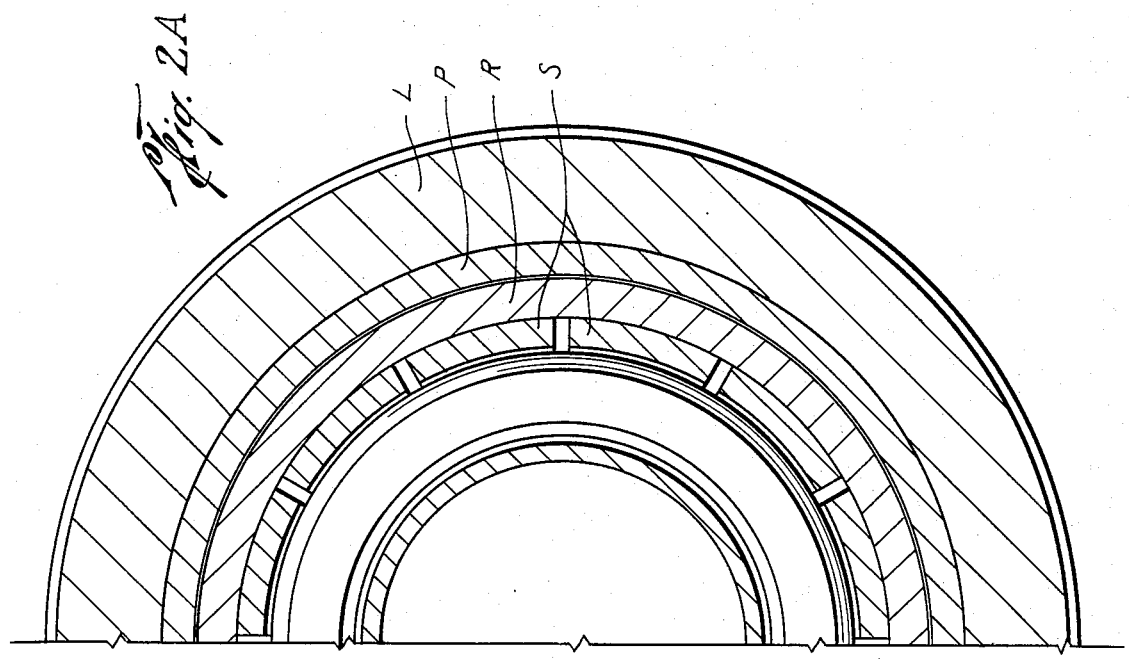
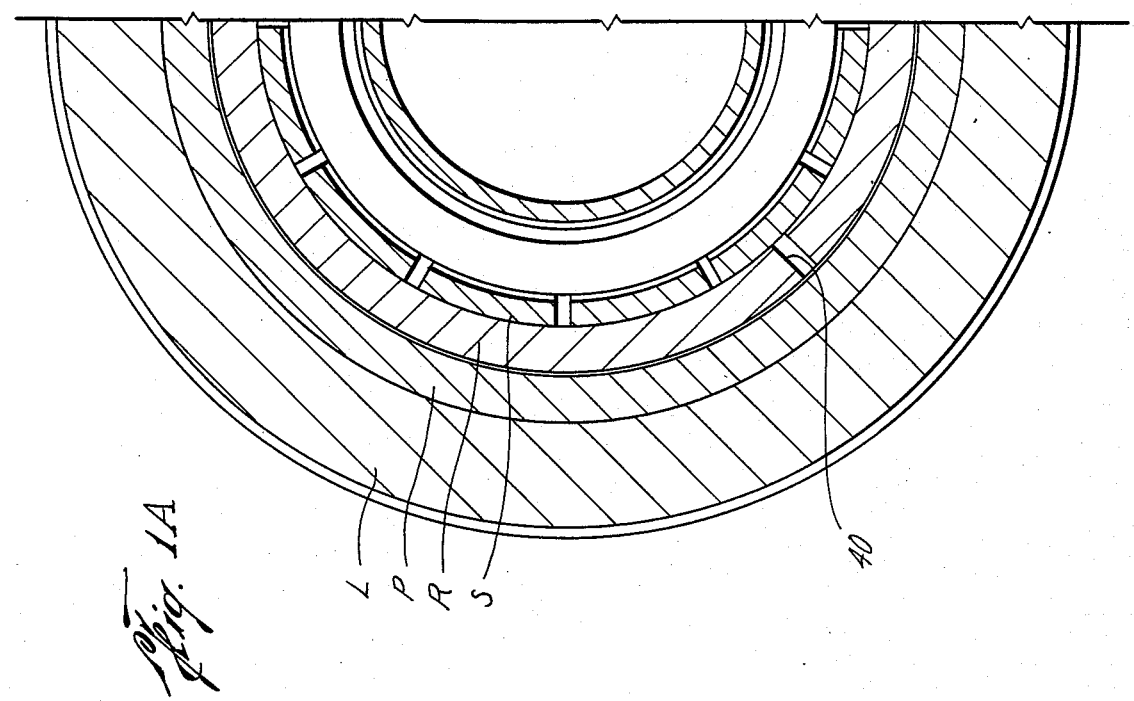

TORUS TYPE CONNECTOR

TECHNICAL FIELD OF THE INVENTION

There are a number of connecting devices for connecting abutting ends of tubular members or for connecting a riser to a subsea wellheads having diagonally directed latches such as U.S. Pat. Nos. Haeber 3,222,088; Ahlstone 3,096,999; Ahlstone 3,321,217; Herring 3,492,027 and Brown 3,554,579. In each of these devices tapered clamping dogs are either pivotally mounted or slidably arranged for engagement with a locking shoulder on the connected member. Such connectors have the common deficiency of either tending to unlock, if hydraulic pressure is not maintained on the locking port, or tend to wedge irretrievably in place if locking pressure is left on the locking port. However, none provides a toroidal surface between the locking segments and its actuating or drive member for moving the dogs into locking relationship with the piece to which they are connected.

SUMMARY OF THE INVENTION

The present invention is directed to a toroidal type connector for releasably connecting two adjacent or abutting members in which one of the members has an annular locking shoulder which is engaged by a corresponding shoulder on a plurality of circumferentially spaced locking segments and wherein the segments are carried by a locking ring secured to the other member. The locking segments include a tapered groove which rolls or cams over a tapered shoulder to move the locking shoulder radially inwardly and outwardly as the torus section moves longitudinally of the locking segments. Further, the center of the arc of the torus moves across the lateral plane of resultant locking forces which thus tend to stay in a locked position when the pressure for moving the torus is released. Similarly, the locking segments do not tend to wedge into an overlock condition if the control pressure is left on the torus section. The torus section is provided with a tapered thread to permit adjustment of the effective diameter of the toroid to compensate for manufacturing tolerances and also to adjust the fit or preload on the locking segments, as desired. The term "preload" in the tubular connector art is known to mean the load imposed on the connected parts prior to the load imposed by internal line pressure being applied to the connection.

DESCRIPTION OF THE DRAWINGS

FIG. 1a is a sectional view taken along the line 1—1a of FIG. 1 showing additional details of the apparatus of the invention;

FIG. 2a is a sectional view taken on line 2—2a of FIG. 2 showing additional details of the invention.

DESCRIPTION OF THE PREFERRED EMBODIMENT

The present invention provides a releasable connector for connecting adjacent or abutting members in some remote location such as underwater connectors used on a subsea wellhead on an oil or gas well and a subsea blowout preventer stack or christmas tree. Also, the connector of the present invention is useful in other remote connector applications such as subsea pipeline connectors, flowline connectors or marine risers.

Figure 1:
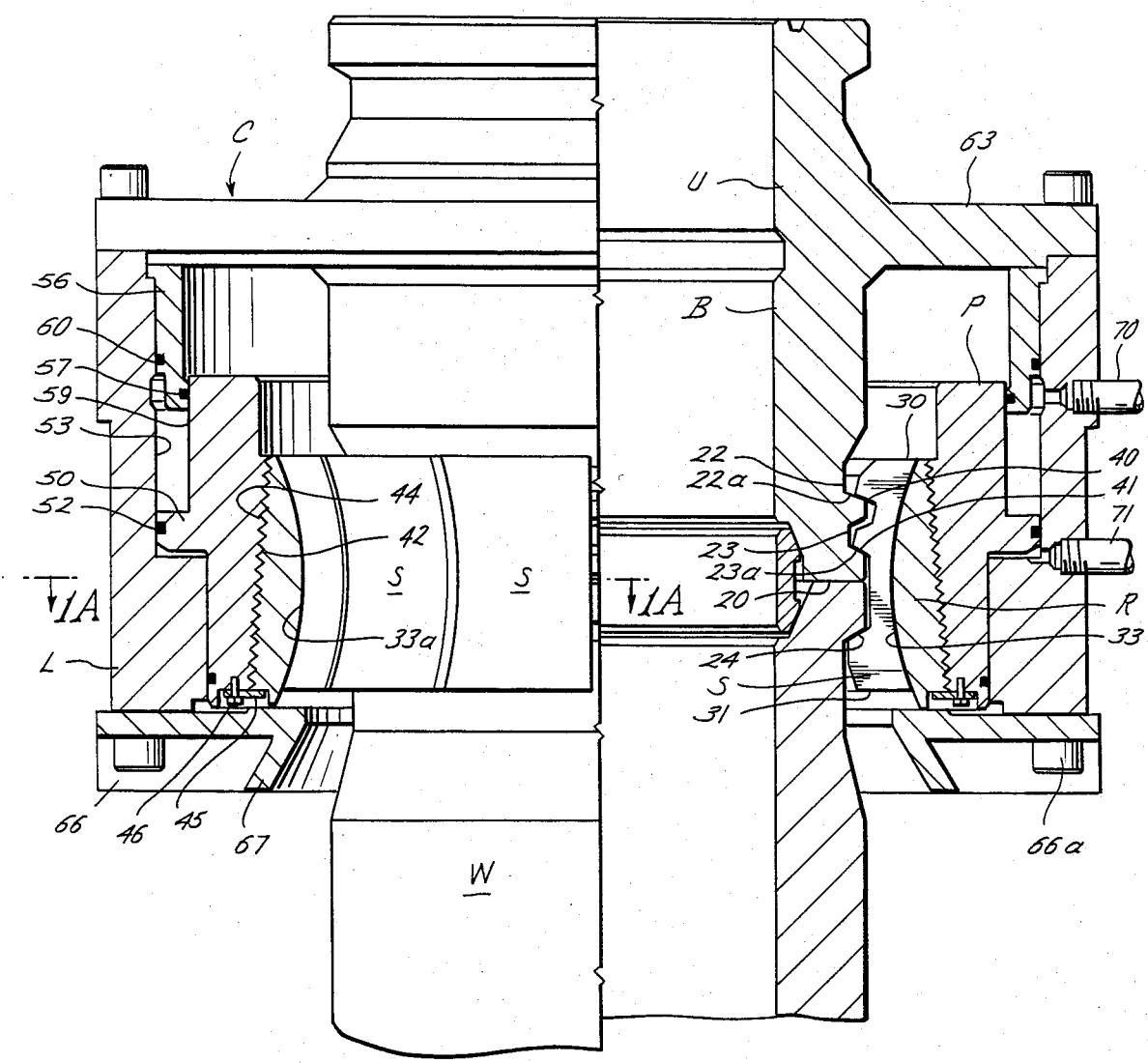
FIG. 1 is a view partially in section and partially in elevation showing the torus connector of the present invention with the locking segments locking the connector to a wellhead.
Figure 2:
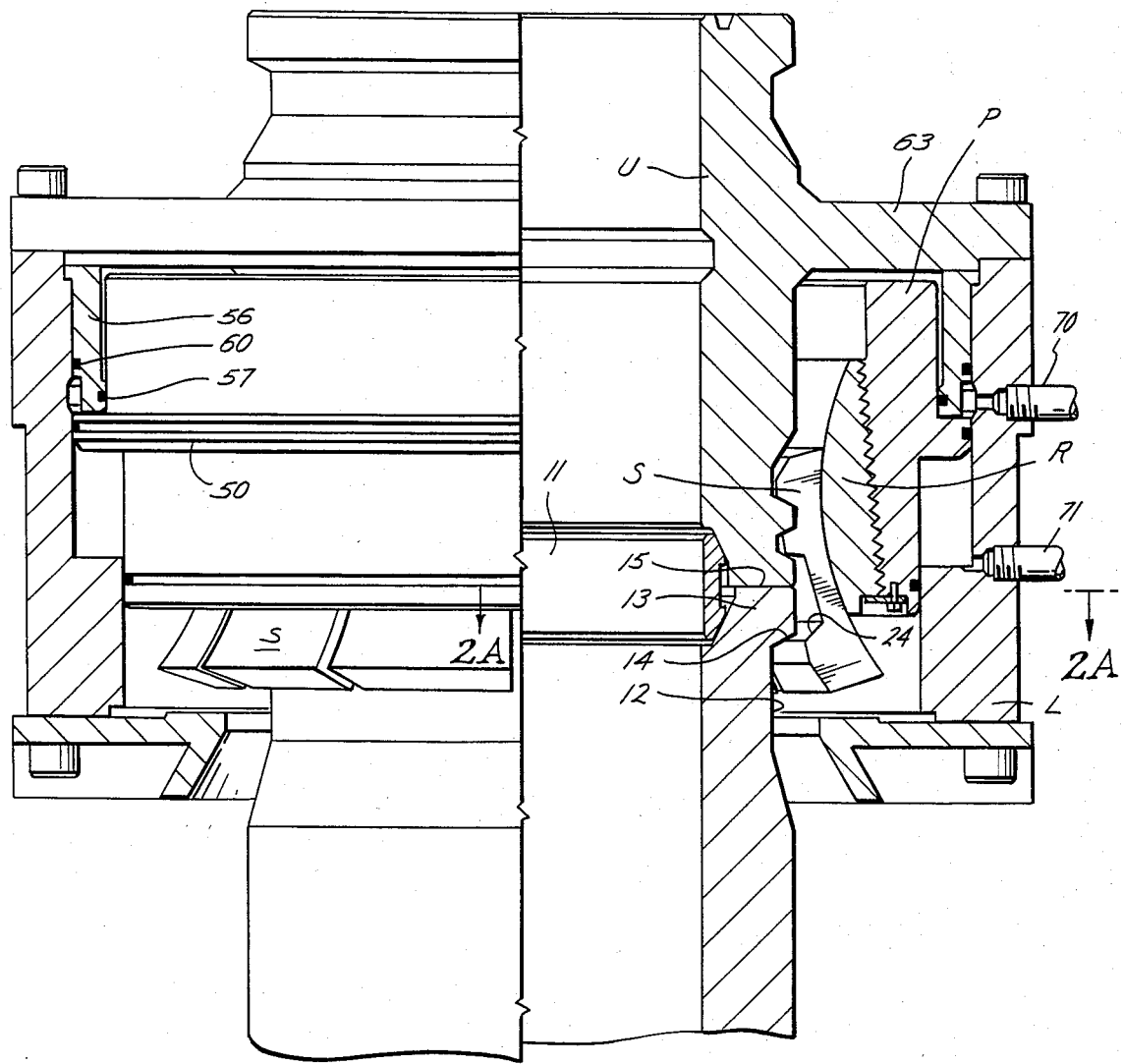
FIG. 2 is a view partially in section and partially in elevation showing the locking segments in the open position preparatory to locking on the wellhead.

As shown in FIG. 1 of the drawings, the torus type connector of the present invention is designated generally C. As shown, such connector is positioned surrounding the upper end of a wellhead W with a plurality of locking segments S which engage locking shoulders on both the wellhead W and the connector body B for locking the wellhead and the connector body together. A torus drive shoe R is mounted on a piston P that is carried in the connector body and which engages the locking segments to roll or cam them from an open position as shown in FIG. 2 to the locked position shown in FIG. 1 and vice versa when the piston P is moved longitudinally or axially of the connector body.

The wellhead W is provided with an upper end, a portion of which is shown in the drawing, and includes a hollow tubular member having a passage P extending therethrough with an inclined inner shoulder at the open upper end for receiving an AX gasket 11 and a locking groove 12 extending around the external circumference of the wellhead for receiving the lower end of the locking segment S as will be described. The locking shoulder 14 is inclined at an angle of approximately twenty-five degrees with respect to the horizontal upper end 15 of the wellhead.

The connector C includes an inner upper body U and an outer lower body L which is positioned concentrically of the upper body. The lower face 20 of the upper body rests on the upper surface 15 of the wellhead and is of substantially the same external diameter as the upper end of the wellhead. The lower end of the upper body also includes a tapered annular shoulder for receiving the AX gasket 11 that is positioned for sealing between the wellhead and the connector body.

the upper body is provided with at least two circumferentially extending locking grooves 22 and 23 near the lower end 20 for receiving the upper portion of the locking segments S.

As shown in the drawings, the locking segments S are provided with substantially parallel upper and lower surfaces 30 and 31 and an arcuate outer surface 33 which is engaged by the torus section R.

The locking segment S includes upper and lower inclined surfaces 40 and 41. The upper inclined locking surface 40 is adapted to engage inclined upper locking surface 22a and the lower inclined locking surface 41 engages the inclined surfaces 23a formed on the upper body U by the circumferentially extending grooves 22 and 23.

Such locking surfaces 22a and 23a on the lower portion of the upper body are inclined at an angle of approximately twenty-five degrees with respect to the plane of the lower surface 20 and are substantially parallel to each other. Similarly, the locking surfaces 40 and 41 are also substantially parallel to each other and inclined at approximately twenty-five degrees with respect to the plane of the surface 20 when in the locked position shown in FIG. 1.

The torus section R extends circumferentially of the housing and is split at 40 (FIG. 1A) to provide a gap so that the effective diameter of the torus section can be minutely adjusted to provide the desired preload on the locking segments S. The torus section R is connected to the piston P by fine calibration threads 42 which are tapered so as to reduce the diameter of the split torus section as it is screwed progressively into the tapered threads 44 on the piston P. A lock member 45 is provided on the piston for locking the torus in position once the desired diameter has been established. Such lock member is secured in the piston by screws such as 46.

The piston body also includes an annular shoulder 50 provided with an O-ring seal 52 which seals the piston with respect to the inner wall 53 of the lower body L. As shown, a top cylinder or sleeve 56 is also provided in the housing and has an O-ring 57 for sealing against the cylindrical surface 59 of the piston. The top cylinder is also provided with an upper O-ring 60 for sealing against the upper inner wall of the lower body L. Such top cylinder or sleeve 56 is removable from the lower body after the upper body U has been disconnected from the lower body. Such upper body includes a top or flange 63 which is secured to the lower body L.

A protector ring 66 is also provided on the housing and includes a tapered skirt or guide portion 67 which facilitates positioning the connector body on the wellhead W. Such tapered skirt protector is secured to the lower body by means of a plurality of bolts 66a.

As shown in FIG. 2 of the drawings upper and lower hydraulic ports 70 and 71, respectively, are provided for communicating hydraulic fluid to the upper and lower sides of the annular shoulder 50 on the piston P.

In operation of the torus type connector of the present invention, hydraulic fluid is injected through the lower port 71 into the chamber formed in the lower body beneath the annular shoulder 50 to raise or lift the piston P from the lower position shown in FIG. 1 to an upper position as shown in FIG. 2 of the drawings with the annular shoulder 50 adjacent the lower end of the sleeve 56.

Thereafter with the segments in the open position shown in FIG. 2, the connector body is lowered into position with the lower surface 20 of the connector resting on the upper surface 15 of the wellhead and with the AX gasket in position in the openings in the ends of the wellhead and upper body, respectively. With the upper ends of the locking segments S secured in the circumferentially extending grooves 22 and 23 on the upper body by the torus drive shoe R and the lower ends of the locking segments swung outwardly into the disconnect position shown in FIG. 2 the connector body can be lowered vertically downwardly so that the lower surface 20 of the connector body rests on the upper surface 15 of the wellhead and with the lower portion of the locking segments S surrounding the locking groove and the upper locking hub 13 of the wellhead. Thereafter, injecting hydraulic fluid under pressure through the upper port 70 into the chamber 71 above the annular shoulder 50 will move the piston P downwardly thereby moving the torus drive shoe R downwardly so as to roll the locking segments S from the open position shown in FIG. 2 of the drawings to the closed position shown in FIG. 1. The locking surfaces 40 and 41 engaging the inclined surfaces 22a and 23a in the upper and lower circumferential grooves 22 and 23 in the upper body U and with the inclined shoulder 24 on the lower portion on the locking segment engaging the inclined shoulder 14 extending around the locking hub 13 on the wellhead W. It will be appreciated that when the torus drive shoe R is in the upper position shown in FIG. 2 of the drawings that the center (not shown) of the arc of curvature 33a on the torus R and the corresponding arc of curvature 33 on the backside of the locking segments is at a position above the plane of the radial reaction forces caused by the clamp separation forces when the locking segments S are in the locked position shown in FIG. 1 of the drawings. Similarly, when the locking segments S are in the locked position the center (not shown) of the arc of curvature of the torus and the locking segments is slightly below the lateral plane of radial reaction forces caused by clamp separation forces. Such clamp separation forces are those forces normal to the longitudinal axis of the passage P extending through the opening in the wellhead W and the upper connector body B. The plane of the lateral reaction forces is the resultant lateral force from a combination of the lateral forces generated by the lower locking shoulder 24 and 14 and the combined lateral forces of the upper locking shoulders 40 and 41 on the pair of inclined shoulders 22a and 23a on the upper body. The plane of the centers of the arcs of the torus curve moves from a position above the radial reaction plane when the locking segments are in the open position to a position slightly below the lateral plane of reaction forces when the locking segments are in the closed position thereby providing a positive locking force on the locking segments even if the hydraulic pressure which moves the piston from the upper to the lower locked position is relieved. It will be understood that while the arc 33 and 33a are shown to be a portion of a circle, that the curved faces of the torus drive R and the segments S can be of varying radii for special purposes.

It will be appreciated that among the advantages to be derived from the apparatus of the present invention is that a progressive mechanical advantage with respect to the forces on the locking segment increases approximately in proportion to the loading required on the connector halves. Further, the present invention allows the collet locking segments to be rolled into place while maintaining a high contact area at all times. Also, the feature of two shallow grooves in the connector body reduces the depth of such grooves and thereby affords room required for the rolling action of the locking segments while providing as much or more clamping surface on the connector than on the wellhead.

Another advantage of the present invention is the use of the tapered thread 44 and split toroid to allow fine adjustment of the effective diameter of the toroid to thereby compensate for any manufacturing tolerances and/or to adjust the fit of the toroid and thereby provide a means to control precisely the preload imposed upon the locking segments. Thus, the connector preload is determined by the mechanical fit of the torus in the piston is not effected by the friction between the sliding surfaces.

The double clamp hub profile formed on a lower end of the upper body provides as much or more clamping surface as provided by the single shoulder 24 on the wellhead W. It will be appreciated that in some situations the connector body will be provided with only a single locking groove 22 or 23 rather than having multiple locking grooves; also the connector may be arranged with multiple locking grooves on the lower end of the segments, if desired.

The foregoing disclosure and description of the invention are illustrative and explanatory thereof, and various changes in the size, shape and materials, as well as in the details of the illustrated construction may be made without departing from the spirit of the invention.

What is claimed is:

1. A connector for connecting tubular members to a wellhead, comprising:
   a. a connector body having a passage extending therethrough and including a lower end with a locking surface formed thereon for receiving locking means;
   b. a plurality of circumferentially spaced locking segments adjacent the lower end said connector body, said locking segments having upper ends and lower ends with a generally concave torodial outer surface between such ends and upper and lower inner locking surfaces for engaging said locking surface on said connector body and a locking surface on said well head;
   c. torus drive means surrounding the locking segments having a generally torodial curved inner surface for engaging the concave torodial curved surfaces on said locking segments for moving the lower ends of said locking segments inwardly into locking engagement with the well head as said torus drive means is moved axially of said connector body in a first direction and moving the lower ends of said locking segments outwardly as said drive means is moved axially of said connector body in the opposite direction; and
   d. means for moving said torus drive means axially in said first and opposite directions with respect to said connector body.

2. The invention of claim 1, wherein said means for moving said torus drive means includes a hydraulic piston mounted in said connector body.

3. The invention of claim 1, wherein said torus drive means extends circumferentially of said connector body less than 360°.

4. The invention of claim 1, wherein said means for moving said torus drive means includes a tapered threaded opening having a larger diameter at one end than at the other end for receiving said torus drive.

5. The invention of claim 1, wherein the plane of the center of the arcs of the arcuate surfaces on said torus drive moves axially of said connector body across the lateral plane of reaction forces of the combined locking forces of said locking segments when in the locked position.

6. The invention of claim 1 wherein said upper inner locking surfaces on said locking segments include a plurality of locking surfaces spaced one above the other.

7. The invention of claim 1 wherein said torus drive means extends less than 360° and has a tapered threaded portion for connection to said means for moving said torus drive means whereby the effective diameter of the torus section can be minutely adjusted to provide a desired preload on the locking segments.

8. The invention of claim 7, wherein locking means is provided for locking the torus drive means to the means for moving the torus drive when the desired effective diameter of the torus drive has been obtained.

9. The invention of claim 1, wherein said torus drive means extends less than 360° and includes a tapered surface with thread means thereon for connecting to said means for moving said drive means for adjusting the effective diameter of said torus drive means.

10. The invention of claim 1, wherein the concave torodial outer surfaces of said locking segments and the torodial curved inner surface of said torus drive means each have substantially the same radius and substantially the same arc of curvature whereby the plane of the centers of the arcs of the concave curved surface can be moved from a position above the radial reaction plane of the locking segments in the open position to a position slightly below the lateral plane of reaction forces when the locking segments are in the closed position to thereby provide a positive locking force on the locking segments.

11. A connector for connecting tubular members together end to end comprising:
   a. a connector body having a passage extending therethrough with at least one locking surface formed on said body for receiving locking means;
   b. a plurality of circumferentially spaced locking means mounted on said connector body wherein said locking means have an arcuate outer surface and locking surfaces for locking to said connector body and locking surfaces for locking to another object;
   c. torus drive means having an arcuate inner surface for engaging an arcuate surfaces on said locking segments for moving the lower ends of said locking segments inwardly as said torus drive means is moved axially of said connector body in one direction and outwardly as said torus drive is moved axially in said connector body in the opposite direction; and
   d. means for moving said torus drive means axially of said connector body.

12. The invention of claim 11 wherein said upper locking surfaces for locking to said connector body include a plurality of locking surfaces spaced one above the other.

* * * * *